June 2, 1959  S. B. PICKLES  2,889,551
AERIAL NAVIGATION EQUIPMENT
Filed Dec. 1, 1955  6 Sheets-Sheet 1

INVENTOR
SIDNEY B. PICKLES
BY Ernest Fanwick
ATTORNEY

June 2, 1959  S. B. PICKLES  2,889,551
AERIAL NAVIGATION EQUIPMENT
Filed Dec. 1, 1955  6 Sheets-Sheet 2

*Fig. 3*

A — COMPLEX ENVELOPE —
(MODULATION PATTERN)

B — FUNDAMENTAL COMPONENT

C — HARMONIC COMPONENT

*Fig. 4*

REFERENCE SIGNAL TRANSMITTED BY BEACON

INVENTOR
SIDNEY B. PICKLES
BY Ernest Fenwick
ATTORNEY

June 2, 1959   S. B. PICKLES   2,889,551
AERIAL NAVIGATION EQUIPMENT
Filed Dec. 1, 1955   6 Sheets-Sheet 3

INVENTOR
SIDNEY B. PICKLES
BY Ernest Fanwick
ATTORNEY

June 2, 1959  S. B. PICKLES  2,889,551
AERIAL NAVIGATION EQUIPMENT
Filed Dec. 1, 1955  6 Sheets-Sheet 4

INVENTOR
SIDNEY B. PICKLES
BY Ernest Fanwick
ATTORNEY

June 2, 1959
S. B. PICKLES
2,889,551
AERIAL NAVIGATION EQUIPMENT
Filed Dec. 1, 1955
6 Sheets-Sheet 5

Fig. 8

INVENTOR
SIDNEY B. PICKLES
BY Ernest Fanwick
ATTORNEY

June 2, 1959  S. B. PICKLES  2,889,551
AERIAL NAVIGATION EQUIPMENT
Filed Dec. 1, 1955  6 Sheets-Sheet 6

INVENTOR
SIDNEY B. PICKLES
BY Ernest Fenwick
ATTORNEY

United States Patent Office 2,889,551
Patented June 2, 1959

2,889,551

AERIAL NAVIGATION EQUIPMENT

Sidney B. Pickles, Monterey, Calif., assignor to International Telephone and Telegraph Corporation, Nutley, N.J., a corporation of Maryland Application December 1, 1955, Serial No. 550,428

8 Claims. (Cl. 343—106)

This invention relates to omnirange navigation systems and, more particularly, to aerial navigation equipment for use with an omnirange beacon system which produces a multiple modulation radiation pattern having a fundamental modulation frequency and one or more additional modulation frequencies harmonically related to the fundamental frequency.

Omnidirectional beacon systems are known having a high order of directional accuracy which are dependent upon the use of a directive antenna pattern rotated at a fundamental frequency and modulated by a harmonic of this fundamental frequency so as to produce a generally multilobed rotating direction radiation pattern. Due to the rotation of the multiple modulation antenna pattern, a receiver located remotely from the transmitting beacon receives energy which is detected at the receiver as an amplitude-modulated wave having a fundamental modulation component and a modulation component at a frequency harmonically related to the fundamental. Reference signals, which are directionally related to the multiple modulation bearing signals, related to the multiple modulation bearing signals, are transmitted from the beacon at both the fundamental and harmonic frequencies, and these reference signals are used for comparison with the received components of the rotating pattern so that the receiver may determine its azimuth relative to the location of the transmitting beacon.

Antennas designed for use with such omnidirectional beacon systems have normally produced a cone of silence extending above the antenna, which in the past has prevented the mobile unit receiver equipment from obtaining any bearing indication while passing through this cone-shaped space or, in other words, from obtaining any bearing while located over the immediate vicinity of the beacon antenna.

It has been found that the vertical angle of coverage of the fundamental frequency is greater than that of the harmonic frequency or, in other words, the cone of silence in which the bearing signal modulation at the fundamental frequency cannot be received is less than the cone of silence in which the harmonic frequency modulation of the bearing signal cannot be detected.

One of the objects of this invention, therefore, is to provide improved aerial navigation receiver equipment capable of obtaining azimuth information from a cooperating omnirange beacon transmitting system through a higher angle of vertical coverage than heretofore possible.

Another object of this invention is to provide aerial navigation receiving equipment capable of yielding azimuth information from both the fundamental and harmonic frequency transmissions of a beacon transmitting a rotating multilobed radiation pattern, wherein the receiver is capable of automatically switching so as to be operable from the fundamental frequency alone when the harmonic frequency is not received.

A further object of this invention is to provide aerial navigation receiving equipment yielding navigational information at extremely high vertical angles over beacons radiating rotating multilobed radiation patterns in which the degree of sensitivity of the receiver is continually decreased thereby rendering the course across the beacon substantially constant in physical deviation.

One of the features of this invention is an aerial navigation receiver which utilizes both the fundamental and harmonic signals emitted by an omnirange transmitting beacon of the type emitting a multilobed rotating radiation pattern, wherein the receiver switches to the utilization of the fundamental frequency component of the bearing signal when the receiver ceases to detect both the fundamental and harmonic frequency radiation components of the bearing signal, thus enabling azimuth information to be obtained through a greater vertical-angle coverage than heretofore possible.

The above-mentioned and other features and objects of this invention will become more apparent by reference to the following description taken in conjunction with the accompanying drawings, in which.

Figure 1:
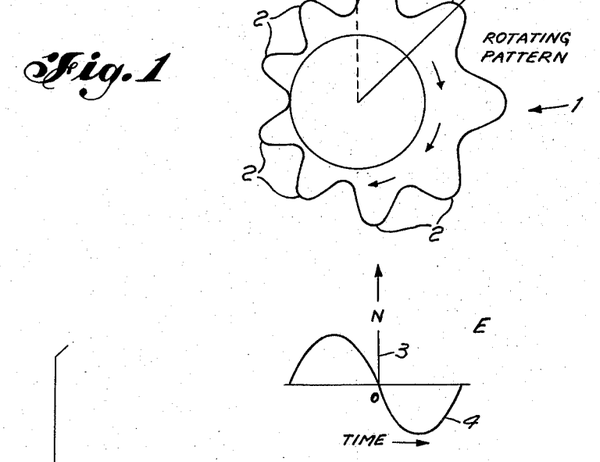
Figs. 1–4 are graphic illustrations of the antenna signal patterns emitted by an omnirange beacon with which the aerial navigation receiver equipment of this invention is designed to cooperate.

Referring to Fig. 1 of the drawings, a polar plot of the rotating multilobed radiation pattern emitted by one type of omnirange beacon antenna system is shown to comprise a directional radiation pattern of generally cardioid shape having a fundamental lobe generally indicated at 1 and a plurality of harmonic lobes indicated at 2. A reference signal is transmitted each time a lobe of the radiation pattern passes a given point. For example, each time the maximum radiation lobe 1 passes the 90° azimuth position, a "North" or fundamental frequency reference signal is emitted; and each time the maximum of each of the harmonic lobes 2 passes the 90° azimuth, a harmonic frequency reference signal is transmitted.

Figure 2:
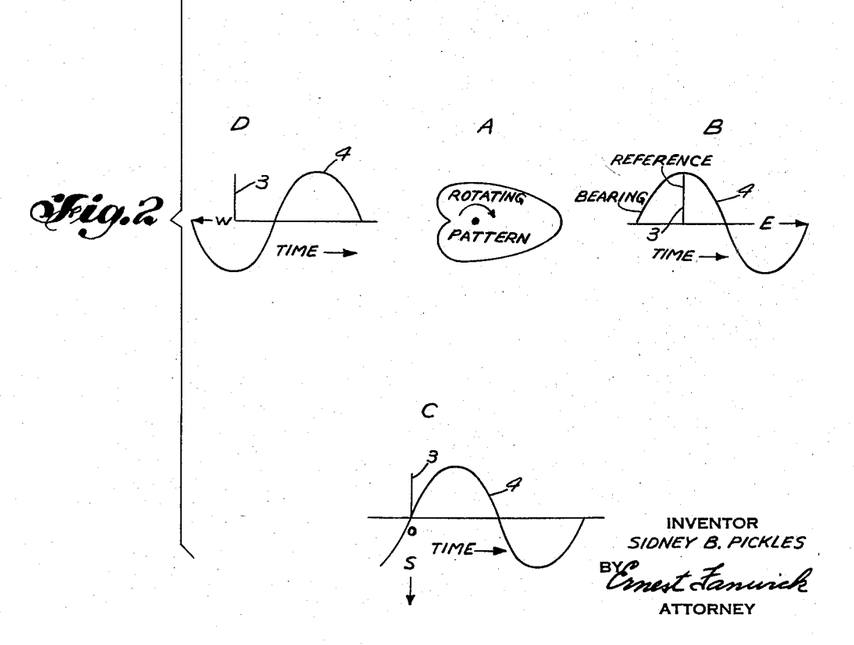

In order to understand the operation of the azimuth determining circuits of the receiver, it is first necessary to describe the characteristics of a typical beacon signal. For purposes of this explanation, the beacon transmitting antenna will be assumed to have a generally cardioid pattern, as shown in Fig. 2, curve A. The North or fundamental frequency reference signals are transmitted when the maximum amplitude of the cardioid antenna pattern is directed east or at the 90° azimuth, as shown in Fig. 2, curve A; therefore, a navigation receiver located east of the beacon antenna receives the maximum radiated signal at the instant that the North reference signal is received, and this condition is shown by Fig. 2, curve B, where the fundamental frequency reference signal 3 is seen to be in phase with the maximum amplitude of the received bearing signal 4. A navigation receiver located west of the beacon receives a minimum signal at the instant that the North reference pulse is detected, as shown in Fig. 2, curve D. It of course follows that a receiver located between the extremes of east and west receives signals that are sinusoidally proportional to the extreme outputs at the instant that the North or fundamental frequency reference pulse is received, as shown, for example, in Fig. 2, curves C and E.

It is thus apparent that as the antenna pattern is rotated at a fundamental frequency the receiver detects a signal that varies sinusoidally with time at a fundamental frequency. When the pattern is directed toward the receiver, a maximum signal is received, while when it is directed away from the receiver, a minimum signal is received. In other directions, as shown in Fig. 2, the detected North reference signal is shifted in phase along the sine wave detected at various azimuths by the receiver and that, in each case, the same sinusoidal waveform, appropriately shifted in phase, is obtained. It is, therefore, possible to determine the azimuth of the receiver relative to the beacon by determining the phase of the fundamental frequency reference signal with respect to the detected fundamental frequency sine wave.

Since the idealized waveforms shown in Fig. 2 are not followed specifically in practice, the comparison of the North or fundamental frequency reference signal with the fundamental frequency bearing signal does not provide an azimuth indication that is sufficiently accurate to meet the requirements of practice. Consequently, harmonic frequency reference signals are compared in phase with a harmonic frequency bearing signal to accurately determine the azimuth of the receiver relative to the beacon; and the fundamental frequency signals are utilized to resolve ambiguities in the harmonic frequency determination.

The harmonic frequency bearing signal is transmitted by an antenna whose radiation pattern is multilobed. Each harmonic frequency pattern lobe covers a sector of the azimuth; for example, if the ninth harmonic is used, 360° of harmonic bearing signal cover 40° of azimuth or, in other words, the harmonic frequency bearing signal received is a complete sine wave for each 40° of azimuth.

Figure 3:
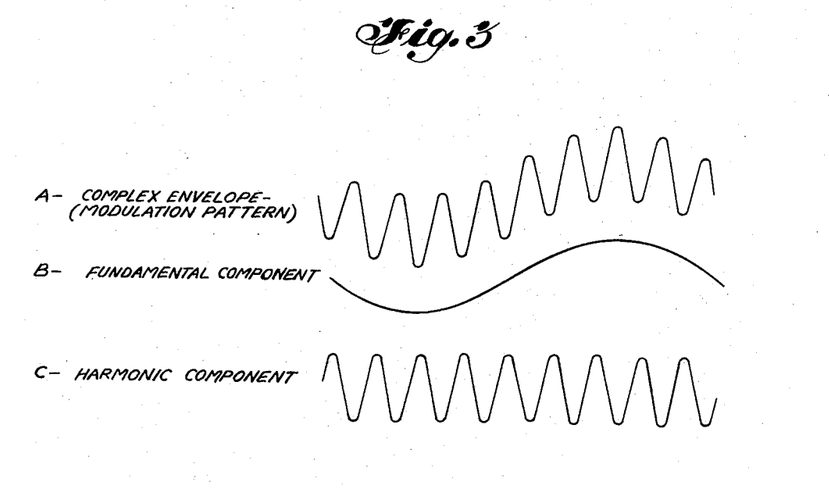

Thus, referring to Fig. 3 of the drawings, it is seen that an equipment receiving the rotating multilobed radiation pattern, shown in Fig. 1, detects a complex envelope wave modulation pattern, shown in Fig. 3, curve A, composed of a fundamental frequency component, illustrated in Fig. 3, curve B, and a harmonic frequency component, shown in Fig. 3, curve C.

Associated with the harmonic frequency bearing signals are auxiliary or harmonic frequency reference signals. For each rotation of the fundamental cardioid pattern, the North reference signal is transmitted. The auxiliary or harmonic frequency reference signal has characteristics distinguishing it from the North or fundamental frequency reference signal. It should be obvious that the rotation rate of the pattern forms the fundamental frequency component of the bearing signal, and the rotation of the harmonic lobes forms the harmonic frequency component of the transmitted signal.

When a receiver is exactly south of the beacon, an auxiliary or harmonic frequency reference signal occurs exactly at the start of an auxiliary or harmonic frequency sine wave; and they would be in zero-phase relationship. As the receiver varies in azimuth, the auxiliary reference signal shifts in phase relative to the harmonic frequency bearing signal component of the radiated pattern. Consequently, it is possible to very accurately determine the azimuth of the receiver to the beacon within a sector by comparing the phase of the auxiliary reference signals with the harmonic frequency bearing signal.

Figure 4:
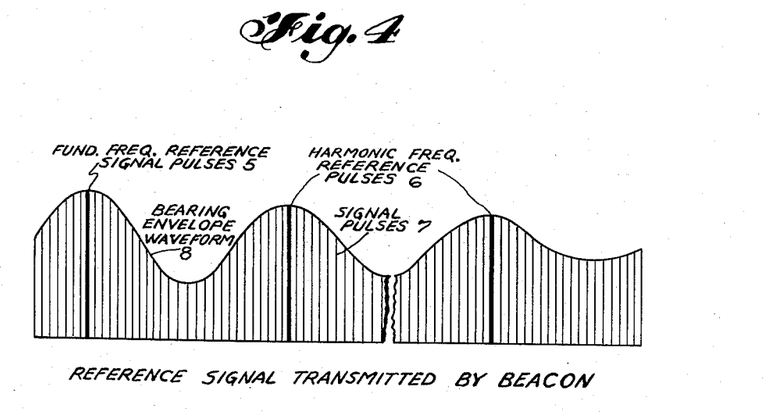

In practice, the beacon transmitter equipment continuously transmits a pulsed bearing signal modulated by the envelope waveform shown in Fig. 4; thus, a series of amplitude-modulated radio-frequency pulses is detected by the receiver. The transmitted pulses are of three types, including: a North reference pulse 5 which occurs at the fundamental frequency rate; auxiliary reference pulses 6 which occur at the harmonic frequency in even intervals between the North pulses 5; and finally, a series of randomly spaced or bearing signal pulses 7 which are amplitude modulated by the rotating antenna system associated with the beacon and provide the envelope waveform 8 functioning as the bearing signal. It should be noted that the waveform shown in Fig. 4 does not attempt to show the actual waveform of the pulses but only the pulse positions and relative amplitudes thereof in the envelope to assist in the explanation of system operation. The waveform envelope 4 emitted by the beacon transmitter contains two components at a fundamental and a harmonic frequency. As heretofore explained, the phase of these components as detected in the receiver relative to the North and auxiliary reference pulses, respectively, is a function of the azimuth of the receiver relative to the ground beacon location.

When a radio receiver designed to cooperate with the ground beacon is within range of the transmitter and tuned to its frequency, the bearing signal is picked up by an antenna system and fed to the receiver where it is amplified and detected. The detected output is then fed to the azimuth circuits where the reference pulses are separated from the carrier envelope. A phase comparison circuit determines the phase of the fundamental frequency component of the bearing signal relative to the North reference signal and locates the azimuth of the receiver within a given sector, for example, 40° if the ninth harmonic is utilized as the auxiliary frequency. Comparison of the phase of the harmonic frequency component of the bearing signal with the 40° or auxiliary reference pulses determines the exact azimuth of the receiver within the 40° sector. To put this another way, the harmonic frequency component of the bearing signal and the auxiliary reference signal pulses are used to determine the azimuth of the receiver; and the fundamental frequency component of the bearing signal and the North reference signal are utilized to eliminate any ambiguity resulting from the utilization of the ninth harmonic. The phase information is converted to azimuth or directional information and displayed on an indicator. It is, of course, apparent that the bearing signal is transmitted continuously and azimuth indication is obtained in the aircraft so long as the receiver is tuned to the proper carrier frequency and receiving both the fundamental and harmonic frequency components and reference signals of the transmitted signal.

Figures 5, 6:
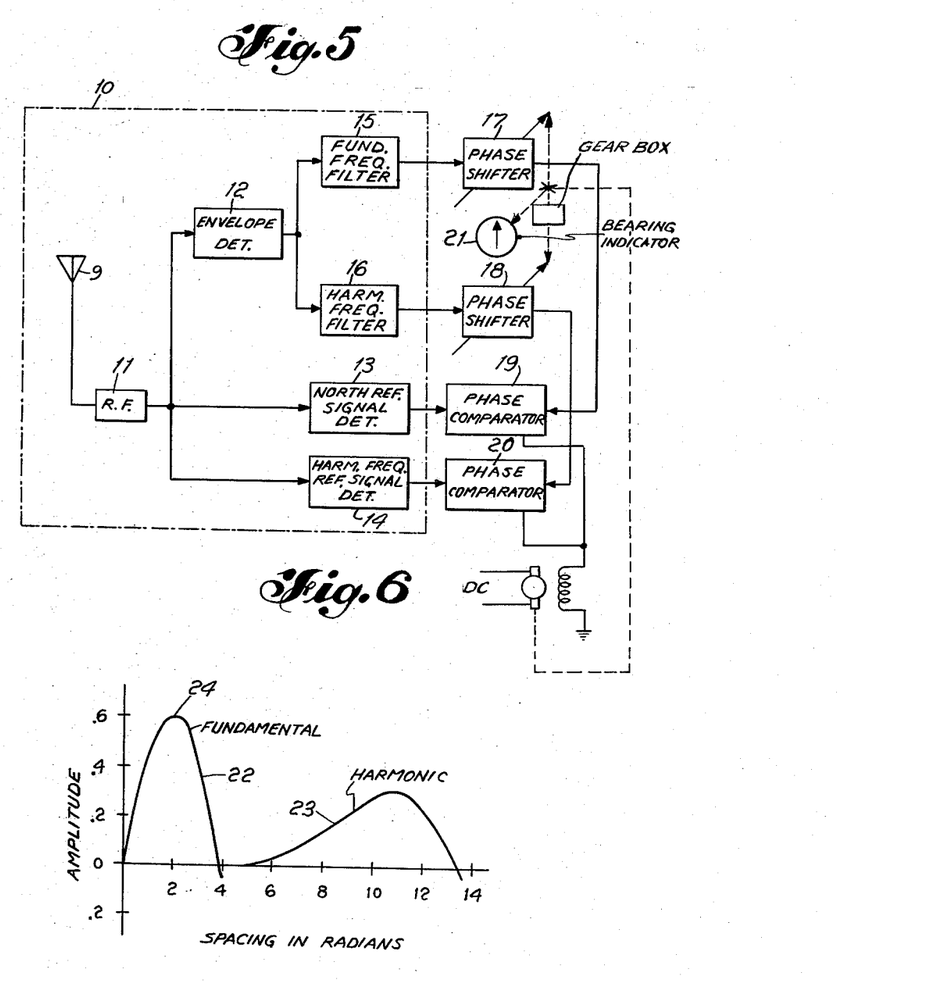
Fig. 5 is a schematic diagram in block form of one embodiment of a known prior art receiver for use with the omnirange beacon emitting the radiation patterns illustrated in Figs. 1–4.
Fig. 6 is a graphic illustration of the amplitude characteristics of the modulation components of an omnirange beacon antenna system designed to cooperate with the receiver equipment of this invention.

Referring to Fig. 5, a schematic diagram in block form of one embodiment of a navigation receiver to cooperate with a beacon radiating a multilobed radiation pattern is shown, wherein an antenna 9 couples its output to the receiver 10 having R-F circuitry 11 which includes the usual amplifier and detector circuits. The output of the R-F circuitry 11 is fed simultaneously to three circuits. The first circuit comprises the envelope detector 12, the output of which consists of the fundamental and harmonic frequency components of the bearing signal shown in Fig. 4. The second circuit 13 detects the North or fundamental frequency reference signals. The third circuit 14 detects the auxiliary or harmonic frequency reference pulses.

The output of the envelope detector 12 is fed to two filters, a fundamental frequency filter 15 and a harmonic frequency filter 16. The outputs of the filters 15 and 16 are the fundamental and harmonic frequency components of the envelope wave of the transmitted signal. The output at each frequency is fed to a phase shifting network 17 or 18, respectively. The fundamental and harmonic frequency components of the bearing signal are compared in phase with the North reference signal and the auxiliary reference signal in phase comparator circuits 19 and 20, respectively, to determine the phase difference and the azimuth of the aircraft. The amount of phase shift necessary to bring the bearing signals and reference signals into coincidence is shown on the indicator 21 whose scale may be calibrated directly in azimuth.

In an aerial navigation system for obtaining azimuth information from a radio signal emitted by an omnirange beacon having a multilobed rotating radiation pattern, I have found that the amplitude characteristics of the bearing information follows a Bessel expansion. Let it be assumed that the multilobed rotating radiation pattern is obtained by rotating a plurality of parasitic reflectors around a central stationary radiator, one of the reflectors being closer to the radiator than the others to produce the fundamental frequency rotation. Referring to Fig. 6 of the drawings, a graphic illustration of the amplitude of the fundamental and harmonic frequency components of the bearing signal versus the spacing between the radiator and reflector portions of the antenna in radians is shown. From Fig. 6, it is seen that the maximum amplitude of the fundamental frequency information represented by curve 22 is obtained by a spacing of two radians of wavelength between the radiators and the fundamental parasitic reflector. Curve 23 represents the amplitude of the harmonic information that is obtained as a function of harmonic parasitic reflectors spaced about the central radiator to radiate the harmonic component of the bearing signal. When an observer looks at the antenna system of the beacon at a zero-degree vertical angle, the time delay is at its greatest; and when the observer looks at the antenna system at a vertical angle of approximately 90°, the time delay between the received signals due to the parasitic reflector and the radiator is at a maximum. In other words, the aperture of the antenna system appears to decrease in the order of the cosine law. When looking at the fundamental frequency modulation alone, I have found that a spacing of two radians of wavelength between the parasitic reflector and the central radiator produces a maximum amplitude, as indicated by 24 in Fig. 6, curve 22. If a vertical angle of substantially 60° is approached with respect to the plane of the radiator, the effective spacing between the radiator and reflector is decreased one half resulting in a substantial reduction in the amplitude of the fundamental frequency component of the bearing signal. This is shown in Fig. 6, curve 22, wherein it is seen that the amplitude ranges from a value of .6 to a value of .44 or substantially a 25% reduction. In the case of the harmonic frequency component, as the spacing between the reflector and radiator ranges from approximately eleven radians to five and one-half radians, the amplitude varies from a value of .3 to about .01. Thus, as a vertical angle of 60° is approached and the effective spacing between the radiator and the reflector is reduced, the amplitude of the harmonic component of the bearing signal fades until it is unusable for navigational purposes.

Figure 7A:
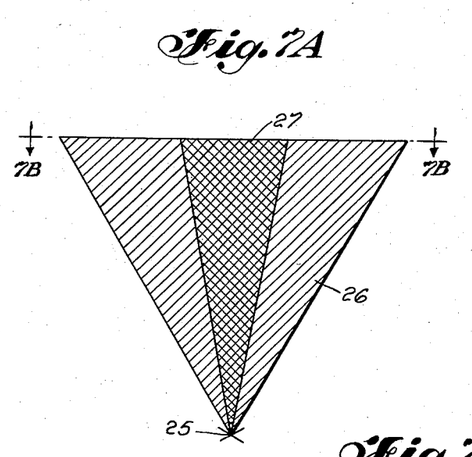
Figs. 7A and 7B are graphic illustrations of the areas of effective radiation of the modulation components.
Figure 7B:
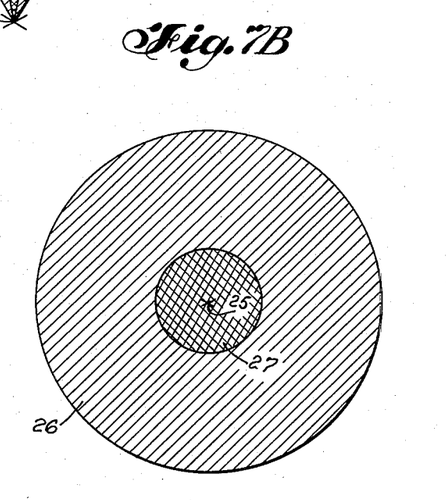
Figure 7C:
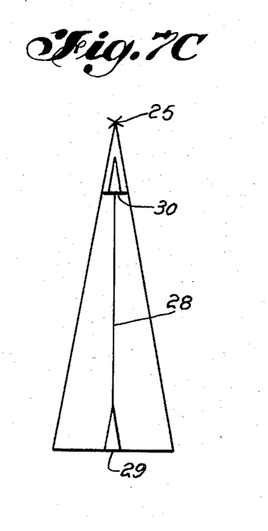
Fig. 7C is a graphic illustration of the course line deviation or sensitivity of receiver equipment in accordance with the principles of this invention.

In the airborne equipment, the accurate azimuth information is obtained primarily from the harmonic signal. Referring to Fig. 7A, a vertical view of the radiation components of a multilobed omnirange beacon is shown, wherein a beacon antenna 25 radiates both a fundamental and harmonic component. As heretofore explained in connection with the explanation of Fig. 6, the harmonic component cannot be detected above a given vertical angle, for example 35°, resulting in a harmonic component cone of silence 26, shown in Fig. 7A, by the light hatching. As heretofore explained, the fundamental component can be detected through a higher vertical angle, for example 60°, resulting in a cone of silence 27 having a smaller diameter at any level, as shown in Fig. 7B. It has been found, in practice, that the harmonic frequency information is usable only up to a vertical angle of approximately 35°. However, I have found that the fundamental frequency component information is still available at a vertical angle of 60°, and at even higher vertical angles, in considerable amplitude. The fundamental frequency component signal information is inherently not as accurate as the harmonic frequency information; but when one is sufficiently close to the site of the beacon transmitter to subtend an angle of 60° to the horizontal, the larger error in the azimuth information will not necessarily result in a larger physical displacement with respect to a course passing over the beacon. For example, in Fig. 7C, if a craft is proceeding along a line 28 using the harmonic information, the craft will have a deviation represented by line 29 for a given change in harmonic signal level. When the craft is closer to the antenna 25 and uses only the fundamental frequency component of the bearing signal, the craft will deviate an amount represented by line 30 for the same change in the signal level. Therefore, the fundamental frequency information is seen to be of ample accuracy for navigational purposes. It is merely necessary to arrange the circuitry in the aerial navigation receiving equipment such that the fundamental frequency signal provides azimuth information when the harmonic frequency signal decreases to an amplitude value which prevents its detection and use.

Figure 8:
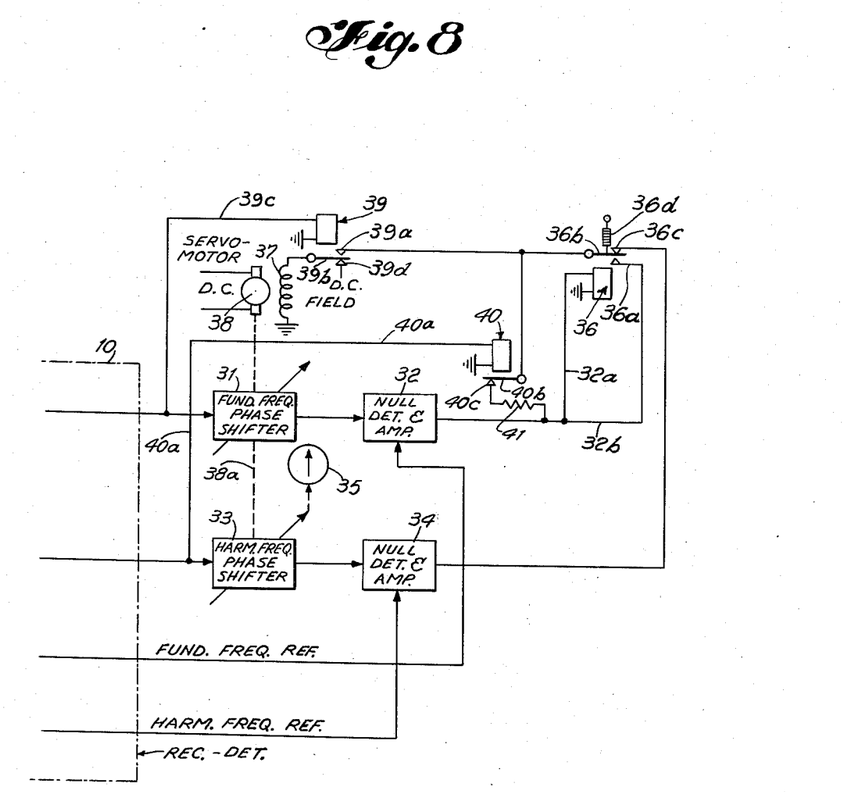
Fig. 8 is a schematic diagram in block form of one embodiment of the receiver circuitry of aerial navigation receiving equipment in accordance with the principles of this invention.

One embodiment of an aerial navigation system receiver in accordance with the principles of my invention is shown in Fig. 8 of the drawings to comprise a servo system controlled by both the fundamental and harmonic frequency information. In the system illustrated, the ambiguities of the harmonic frequency information are resolved by the use of the fundamental frequency signal; and a zero voltage in the output of the harmonic frequency voltage information causes a relay to actuate a servo motor to obtain its field-winding energization from the output of the fundamental frequency voltage signal. Referring more particularly to the system shown in Fig. 8, the receiver and the detector portion 10 is similar to the receiver and detector portion 10 shown in the receiver of Fig. 5. The output of the receiver and detector portion 10 comprises the fundamental and harmonic frequency components of the bearing signals and the fundamental and harmonic frequency reference signals. The fundamental frequency component of the bearing signal is coupled through the fundamental frequency phase shifter 31, the output of which is coupled to the null detector and amplifier circuitry 32. The fundamental frequency reference signal from the receiver portion 10 is coupled as the second input to the fundamental frequency null detector and amplifier circuitry 32. As will be readily understood by those skilled in the art, the fundamental frequency phase shifter 31 is adjusted until a null is detected by circuitry 32 thus assuring that in the output of the circuitry 32 the fundamental frequency reference and bearing signals are in phase.

The harmonic frequency bearing signal from the receiver and detector portion 10 is coupled to the harmonic frequency phase shifter 33, the output of which is coupled to the harmonic frequency null detector and amplifier circuitry 34. The other input to circuitry 34 comprises the harmonic frequency reference signal from the receiver portion 10. The phase shifter 33 is adjusted until the circuitry 34 indicates a null thus assuring that the harmonic frequency bearing and reference signals are in phase. The adjustment of the fundamental frequency phase shifter 31 and the harmonic phase shifter 33 to cause a null to be detected in circuitry 32 and 34 is under the control of the servo motor 38 through shaft or mechanical linkage 38a. The adjustments necessary to bring the fundamental and harmonic frequency phase shifters 31 and 33 into phase with the reference signals, as indicated by null detector circuits 32 and 34, are displayed on indicator 35 which shows the azimuth of the receiving equipment relative to the transmitting beacon.

When the null detector and amplifier circuit 32 output comprises an error voltage indicating that the fundamental frequency bearing and reference signals are not in phase, current is fed through coil of relay 36 over line 32a to actuate the spring-loaded armature 36b of relay 36 causing it to make contact with the lower terminal 36a, allowing the fundamental frequency error voltage to be coupled over line 32b and through relay contacts 39a to the field winding 37 of the servo motor 38. The servo motor 38 is now actuated from the fundamental frequency null detector 32 output and causes the fundamental frequency phase shifter 31 to rotate until a null is detected by circuitry 32. When the fundamental frequency reference and bearing signals are in phase due to the adjustment of the phase shifter 31, the output of the null detector circuitry 32 falls to zero; and the spring-loaded armature 36b is moved into contact with the upper terminal 36c. When the armature 36b is in contact with the upper terminal 36c, the field winding 37 of the servo motor 38 is energized by the output of the harmonic frequency null detector 34 causing the servo motor 38 to position the phase shifter 33 in response to the phase comparison of the harmonic frequency bearing and reference signals in the null detector 34.

As previously explained, when the navigation receiver is positioned over the transmitting beacon at a vertical angle in which the harmonic frequency bearing signal tends to disappear, the use of the harmonic frequency signal becomes inadvisable; and bearing should be dependent upon the fundamental frequency signals alone. When the navigation receiver is at such a vertical angle, the harmonic frequency bearing signal tends to disappear. A relay 40 is provided which is energized from the detected harmonic frequency bearing signal coupled to the harmonic frequency phase shifter over line 40a. Relay 40 becomes de-energized when the harmonic frequency bearing signal ceases to be detected; and when de-energized, the armature 40b makes contact with the terminal 40c. When the relay is de-energized and armature 40b engages contact 40c, it completes a circuit; and the output of the fundamental frequency null detector 32 is again coupled to the field winding 37 of the servo motor 38 through resistance 41. When this occurs, servo motor 38 obtains the fundamental frequency error information signal; and if there is an appreciable error between the azimuths as determined by the fundamental and harmonic frequency signal comparisons, the resistance 41 imposes a time delay in the indication displayed by meter 35 and prevents the fundamental frequency null detector output from making a marked change in a short period of time in the azimuth-indication display on the meter 35.

When no fundamental frequency bearing signal is detected in the receiver and detector circuitry 10 and thus no signal is coupled over line 39c, the relay 39 is de-actuated causing the armature 39b to fall and make contact with terminal 39d; and field winding 37 of the servo motor 38 is energized from the D.C. source. When the servo motor 38 is energized from the D.C. source, hunting by the motor 38 is perpetuated thus preventing the azimuth indicator 35 from giving false indication when there is a complete lack of fundamental frequency bearing signals. This relay 39 is an effective fail-safe provision.

Figure 9:
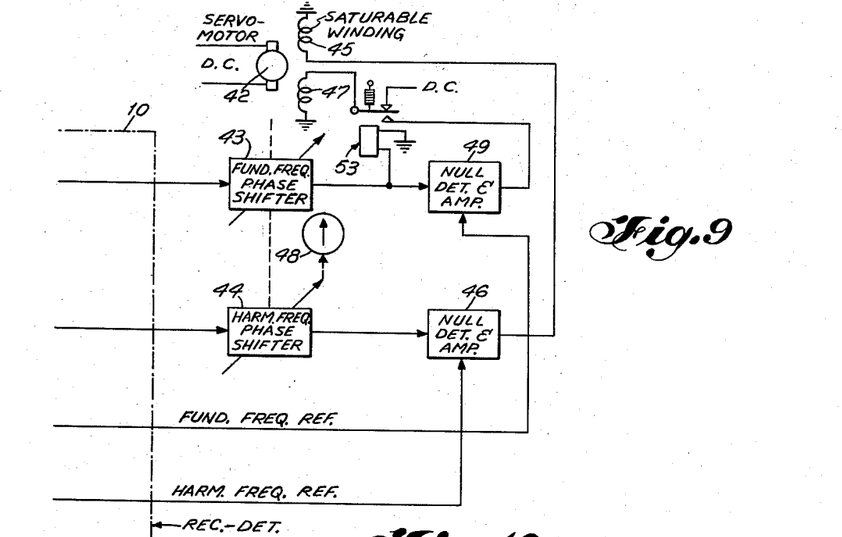
Fig. 9 is a schematic diagram in block form of an alternate embodiment of aerial navigation receiver equipment in accordance with the principles of this invention.
Figure 10:
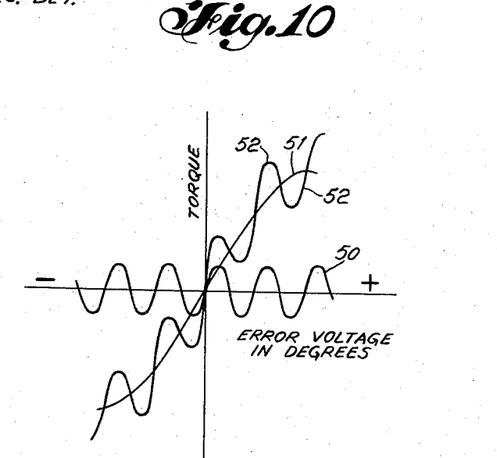
Fig. 10 is a graphic illustration useful in describing the servo motor operation in the receiver circuitry.

Referring to Fig. 9, an alternate embodiment of a navigation receiver in accordance with the principles of my invention is shown, wherein the servo motor 42 that controls the fundamental and harmonic frequency phase shifters 43 and 44 utilizes two field windings. The auxiliary field winding 45 to which the harmonic frequency error signal output of the harmonic frequency null detector circuit 46 is coupled is easily saturated or, in other words, the auxiliary field structure 45 is such that a small amount of direct current produces saturation of the core associated with that winding. The primary field winding 47 connected to the output of the fundamental frequency null detector 49 has the normal characteristics for a D.C. motor. The fundamental frequency error signal causes the armature of the servo motor 42 to rotate until nearly a zero error is obtained in the output of the fundamental frequency null detector 49, as indicated by curve 51, Fig. 10. Simultaneously, the auxiliary field winding 45 has a flux responsive to the output of the harmonic frequency null detector 46 and thus steeply adds to or subtracts from the flux produced in response to the fundamental frequency error signal in the primary winding 47 but only to a limited degree, as shown in curve 50, Fig. 10. The field windings 45 and 47 are so designed that none of the ambiguities in the harmonic frequency signal cause the resultant total flux in the servo motor field core to approach a zero value except to the simultaneous zero crossing of both the fundamental and harmonic frequency signals, as shown in curve 52, Fig. 10. Thus, referring to Fig. 10, it is seen that curve 50 represents the torque in the armature of the servo motor due to the flux induced in the auxiliary field winding by the output of the harmonic frequency null detector 46 and curve 51 represents the torque induced in the armature of the servo motor 42 by the flux induced in the primary field winding 47 by the output of the fundamental frequency detector 49 and curve 52 is the resultant torque due to the flux induced in the core of the field winding due to both the fundamental and harmonic frequency error voltages. Referring again to Fig. 9, a relay 53 is provided to insure fail-safe operation. In the event that no fundamental frequency bearing signal is detected, the relay 53 is de-activated causing the spring-loaded armature to couple a source of direct current to the primary field winding 47, causing the servo motor 42 to hunt until such time as a fundamental frequency signal is received.

While I have described above the principles of my invention in connnection with specific apparatus, it is to be clearly understood that this description is made only by way of example and not as a limitation to the scope of my invention as set forth in the objects thereof and in the accompanying claims.

I claim:

1. A navigation receiver to cooperate with an omnirange navigation beacon system which produces by rotation of a multilobed radiation pattern a variation in amplitude corresponding to a bearing determining signal having fundamental and harmonic frequency components and modulated with reference signals at said fundamental and harmonic frequencies, said receiver comprising means for separating said bearing signal component at said fundamental frequency, means for separating said bearing signal component at said harmonic frequency, means for separating fundamental frequency reference signal, means for separating said harmonic frequency reference signal, first means for comparing the phase difference of said harmonic frequency reference signal and said harmonic frequency bearing signal and second means for comparing the phase difference of said fundamental bearing signal and said fundamental frequency reference signal, directional indication means responsive to the phase differences of said compared reference and bearing signals, means for determining the amplitude of said harmonic frequency bearing signal, and switching means responsive to said amplitude measurement to cause said directional indication means to be responsive only to the phase difference between said fundamental frequency bearing signal and said fundamental frequency reference signal when said amplitude measurement is less than a predetermined level.

2. A radio navigation receiver for indicating the bearing from a receiving point to a beacon emitting a bearing signal as a directional radiation multilobed pattern rotating at a fundamental frequency and producing a harmonic frequency responsive to the plurality of lobes of said rotating pattern and a first series of reference signals at said fundamental frequency and a second series of reference signals at said harmonic frequency, said receiver comprising means for detecting said fundamental frequency bearing signal, means for detecting said first series of reference signals, means for detecting said harmonic frequency bearing signal, means for detecting said second series of reference signals, means for determining the sector of azimuth of said receiver relative to said beacon responsive to the phase comparison of said fundamental frequency bearing signal and said first series of reference signals, means for determining the amplitude level of said detected harmonic frequency bearing signal, means for determining the phase difference between said harmonic frequency reference signal and said second series of reference signals, and means responsive to a predetermined amplitude level of said harmonic frequency bearing signal to determine the azimuth within said sector of said receiver to said beacon responsive to the phase difference between said harmonic frequency bearing signal and said second series of reference signals.

3. A direction indicating receiver for indicating the direction line from a receiving point to a beacon by means of signals emitted from said beacon, said signals comprising a bearing envelope wave having a phase determined by the position of the receiver with respect to the beacon composed of fundamental and harmonic frequency components and modulated by reference signals at said fundamental and harmonic frequencies comprising means for receiving said bearing envelope wave, means to separate the fundamental and harmonic frequency components of said bearing envelope wave, means to detect said fundamental and harmonic frequency reference signals, means for comparing the harmonic frequency component of the bearing envelope wave with the harmonic frequency reference signal to provide an azimuth indication, means for determining the amplitude of said harmonic frequency bearing signal, means to compare the phase of the fundamental frequency components of said envelope wave with the fundamental frequency reference signals to provide a coarse indication, and means for indicating said direction line responsive to said coarse indication when the amplitude of said harmonic frequency bearing signal is less than a predetermined level.

4. A radio navigation receiver to cooperate with a beacon which produces by rotation of a multilobed radiation pattern a bearing determining signal having fundamental and harmonic frequency components and modulated with reference signals at said fundamental and harmonic frequencies, said receiver comprising means for separating said bearing signal components at said fundamental and harmonic frequencies, means for separating said fundamental and harmonic frequency reference signals, means for coupling said fundamental and harmonic frequency bearing signals to first and second phase shifting means, respectively, first phase comparison means to compare the phase of said fundamental frequency reference signal and the output of said first phase shifting means, second phase comparison means to compare the output of said second phase shifting means and said separated harmonic frequency reference signal, means to vary said first and second phase shifting means responsive to the output of said second phase comparator means, means to determine the amplitude level of the bearing signal components at said harmonic frequency, and means to cause said phase shifter driving means to be responsive to the output of said phase comparator means when said determined amplitude is less than a predetermined level.

5. A radio navigation receiver according to claim 4, wherein said means to drive said first and second phase shifting means includes a servo motor having an armature and field winding, a source of direct current, means to couple said armature to said source of direct current, first relay means to couple the output of said first phase comparator means to said field winding, relay means responsive to a null output of said first phase comparator means to disconnect the output of said first phase comparator means and to cause the output of said second phase comparator means to be coupled to said field winding, and second relay means responsive to the detected harmonic frequency component of the bearing signal to cause the output of said first phase comparator means to be coupled to said field winding when said harmonic frequency bearing signal is less than a predetermined level.

6. A navigation receiver according to claim 5 which further includes a third relay responsive to the amplitude of said detected fundamental frequency component of the bearing signal to cause said field winding to be coupled to a source of direct current when said detected fundamental frequency bearing signal is below a predetermined level.

7. A navigation receiver according to claim 4, wherein said phase shifter driving means includes a motor having an armature, a first field winding and a second field winding, means to couple the output of said second phase comparator means to said second field winding to cause saturation thereof, means to couple the output of said first phase detector means to said first field winding, and means to mechanically couple the output of said motor armature to said first and second phase shifting means.

8. A navigation receiver to cooperate with an omnirange navigation beacon which produces by rotation of a multilobed rotating radiation pattern variation in amplitude corresponding to a bearing determining signal having higher and lower frequency components and modulated with reference signals at said lower and higher frequencies, said receiver comprising means for separating said bearing signal components at said higher and lower frequencies, means for separating said reference signals at said higher and lower frequencies, means for comparing the phase difference of said reference signal and said bearing signal at said higher frequency to yield an azimuth indication having a predetermined sensitivity, means for determining the amplitude of the bearing signal at said higher frequency, means for comparing the phase of the bearing and reference signals at said lower frequency, and switch-over means responsive to said amplitude measurement to cause said directional indication means to be responsive to the phase comparison at said lower frequency to decrease the sensitivity of said navigation receiver when the amplitude of said higher frequency bearing signal is below a predetermined level.

No references cited.